(12) United States Patent
James

(10) Patent No.: US 9,353,254 B1
(45) Date of Patent: May 31, 2016

(54) POWDER COATING FLOW AID

(71) Applicant: Joseph H. James, Brentwood, TN (US)

(72) Inventor: Joseph H. James, Brentwood, TN (US)

(73) Assignee: PISON STREAM SOLUTIONS, Brentwood, TN (US)

( * ) Notice: Subject to any disclaimer, the term of this patent is extended or adjusted under 35 U.S.C. 154(b) by 429 days.

(21) Appl. No.: 13/872,648

(22) Filed: Apr. 29, 2013

Related U.S. Application Data

(60) Provisional application No. 61/647,553, filed on May 16, 2012.

(51) Int. Cl.
*C08L 63/00* (2006.01)
*C08L 33/14* (2006.01)

(52) U.S. Cl.
CPC ..................................... *C08L 33/14* (2013.01)

(58) Field of Classification Search
CPC ....................................................... C08L 63/00
USPC ........................................................... 523/456
See application file for complete search history.

(56) References Cited

U.S. PATENT DOCUMENTS

| | | | | |
|---|---|---|---|---|
| 4,251,255 | A  * | 2/1981 | Wagner et al. | ..................... 71/27 |
| 5,786,308 | A  * | 7/1998 | Eicken et al. | ................. 528/403 |
| 5,997,944 | A  * | 12/1999 | Schulte et al. | ................. 427/195 |
| 2003/0055142 | A1* | 3/2003 | Steckel | ......................... 524/308 |
| 2004/0254278 | A1* | 12/2004 | Schieferstein et al. | ....... 524/315 |
| 2006/0216630 | A1* | 9/2006 | Ninomiya et al. | ......... 430/111.4 |

* cited by examiner

*Primary Examiner* — Megan McCulley
(74) *Attorney, Agent, or Firm* — Thompson Hine LLP

(57) ABSTRACT

A combination of polyester hydroxyl resin, polyethylene resin, and spherical glass flakes blended in conjunction with additional constituents such as polymeric curatives, degassing agents, blended and extruded as master batch and having introduced (3-aminoproply)trimethoxysilane and silica type carriers such as silicone dioxide at (45-55% active) reduces orange peel significantly.

13 Claims, No Drawings

POWDER COATING FLOW AID

CROSS-REFERENCE TO RELATED APPLICATION

This application claims the benefit of U.S. Provisional Application 61/647,553 filed May 16, 2012.

BACKGROUND

Powder coating compositions are dry free flowing powders applied in the fusion coating process. A fusion coating process is a process in which a coating powder is distributed over a substrate and, when heated fuses to form a continuous film. The substrate may be heated or unheated when the powder is applied thereto. Heat supplied from the substrate or from an external source, such as an oven, causes the powder to fuse into the continuous film. Known fusion coatings processes for application of powder coating compositions to a substrate include electrostatic spraying, fluidized bed coating and hot flocking.

Polyurethanes, hybrid polyester and epoxy resin combinations, TGIC (triglycidylisocyanurate), Primid resin systems using polyisocyanate curatives and non-TGIC type platform finish coatings are fused to form a film which has a uniformly random series of irregularities or defects, ranging from a slight to severe orange peel surface which are in some cases unique non-repetitive random patterns.

Powder coating compositions may be made of many different resin materials including epoxy, epoxy-polyester, urethane-polyester, TGIC-free polyesters and acrylic coating materials. TGIC-free refers to resins which are free of triglycidylisocyanurate. Other components or constituents include curatives, flow aids, degassing agents, catalysts, pigments, modifiers, fillers and charge inhibitors.

One problem facing applicators of powder coating materials involves formation in the film of a type of surface defect. In the industry surface defects know as orange peel or surface tension are known. Surface tension can be defined as an irregularity which affects the flow resulting in orange peel after product solidification. However for some applicators this can be controlled by increasing or decreasing film build or thickness. The presence of such anomalies of surface tension in the film may result in rejection of the coated article by the customer. Any such rejection may result in discarding of many thousands of powder coated articles or in costly reworking such articles.

Typical efforts to minimize surface tension have been directed toward improving powder coating material flow characteristics. Efforts such as increasing extruder temperature and mix times and increasing flow additives have been tried. These efforts have not been satisfactory because they may result in undesired side effects such as a condition known as "edge pulling" Edge pulling is a condition in which the coating pulls away from the corners of the coated substrate resulting in incomplete formation of the finish.

SUMMARY

The flow aid disclosed herein and identified as PF45 is particularly advantageous because in addition to being effective as a flow aid it can be effective as a leveling agent and as a scratch and mar resistant additive.

It has now been discovered that a combination of polyester hydroxyl resin, polyethylene resin, and spherical glass flakes blended in conjunction with additional constituents such as polymeric curatives, degassing agents, blended and extruded as master batch and having introduced (3-aminoproply)trimethoxysilane and silica type carriers such as silicone dioxide at (45-55% active) reduces orange peel significantly. The silica carrier is used in an amount of about 0.5 to 5.0% by weight based the balance of the flow aid composition being 100% as shown in the tables below.

In one embodiment the flow aid is introduced to platform coating systems in an amount of about 0.5%-1.5%. In accordance with one embodiment or implementation of the invention, conventional flow and leveling agents or additives such as modified polyacrylates are not necessary. For example, flow additives such as polyacrylates are polymers or co-polymers of esters of methacrylic and acrylic acids, flows aids and leveling agents such as Resiflow P-67 (Estron Chemical), Resiflow P-1200 (Estron Chemical), Resiflow P-65, (Estron Chemical), Oxymelt A-2 (Estron Chemical), Modaflow 2000 (Cytec), and X-22 from Monsanto are not required.

Representative examples of polyester hydroxyl resin useful in one embodiment include: Crylcoat 2401-2, Crylcoat 2471-4 (from Cytec Industries) SP-100, SP-400 (from Sun Polymers) and Rucote 102, 106, and Rucote 118 (from Bayer Material Science).

Representative examples of polyethylene resins useful in one embodiment include high density polyethylene resins (HDPE) such as DGDB-2480NT, DGDA-5004 NT7 (from Dow Chemical), and low density polyethylene (LDPE) resins such as 5351 low density polyethylene resins (from Dow Chemical); ethylene copolymers such as vinylidene fluoride polymers and hydroxyl-modified copolymers from Dow Chemical, and AG-300, AG-500 GMA, from Sun Polymer, Mooresville Ind.

Representative curatives useful in one embodiment include, Crelan NI2 blocked cycloaliphatic polyisocynate, Dow Chemical TGIC, (triglycidylisocyanurate), Epikure 101 Imidazole Adduct, Epikure P-108 DICY Imidazole Adduct, aliphatic and cycloaliphatic amine curing agent from Momentive Industries and phenolic hardener DEH84 from Dow Chemical.

One of the advantages of the flow aid PF 45 in comparison to other coating additives and leveling agents is PF45 can be inserted directly into a smooth texture coating platform binder system such as polyurethane, hybrid, TGIC, and Primid systems (manufacturers include EMS, Sun Polymer, Kukdo, Seoul, South Korea and Dow Industries). For epoxy system platforms Kukdo Epoxy Resins KD-211E, KD-211G, KD-242G, KD-243C and Dow's D.E.R 633U and Vantico GT7013 epoxy resin at about 0.5% up to about 4.0% by weight of total binder. In addition this flow aid can also be post added/blended at about 0.03% up to about 0.9% by weight to act as an extender to current flow aids in formulation.

In one implementation a powder coating compositions comprises about 85 to about 99.9% by weight of a finish powder coating platform and about 0.5% to about 1.5% by weight of the component (PF45) for controlling the surface tension. Unless otherwise stated, all percentages stated herein are weight percentages based on the total powder coating composition or of the flow aid (PF 45) component thereof as indicated herein.

Powder coating platforms containing the flow aid additive component is preferably added to a conventional thermosetting powder coating resin material. The material is selected from one more of the groups of epoxy, epoxy-polyester and TGIC-free polyester resins. Conventional additives, such as hardeners, tetramethoxy glycoluril, pigments, waxes, catalyst, flow aids, degassing agents and gloss modifiers may be included in the powder coating material composition.

Representative and suitable epoxy resins include Kukdo Epoxy resin KD-242U, KD-242U, which are is bisphenol-A type solid epoxy resin which have excellent flow characteristics. KD-242U has an epoxy equivalent weight specification of 0.05 max. (wt %), a softening point of about 85 to 95° C., a melt viscosity of specification of about 1000 to 4000 cps at 150° C., and a volatile content specification of 0.30 maximum (wt. %). Suitable hardeners include Kukdo KD-401, KD-41, KD-410J, Epikure 101 and Dyhard 100.

Dow/Bayer D.E.R 663U is a solid epoxy resin and is a standard medium molecular weight epoxy resin for powder coatings application. The resin has an epoxy equivalent weight specification of 730-820 (g/eg), a softening point specification of 92-102 C. and a melt viscosity specification of 2000-4000 cps at 150° C. Suitable hardeners include Kukdo KD-401, KD-41, KD-410J, Epikure 101 and Dyhard 100.

Representative examples of epoxy-polyester resins useful in one embodiment include: Crylcoat 2401-2, Crylcoat 2471-4 from Cytec Industries; SP-100, SP-400 from Sun Polymers; and Rucote 102, 106, and Rucote 118 from Bayer Material Science.

The table below shows one example of a flow aid formulation in accordance with one embodiment of the invention (column 2) and approximated weight ranges covering other embodiments of the invention.

TABLE 1

| Constituents Control Component | Weight % (approximate) | Ranges (approximate) |
|---|---|---|
| 1. Polyethylene Type | 6.2 | 3.1-9.5 |
| 2. Polyester powder binder system | 41.210 | 35-50.0 |
| 3. Polymeric curative | 8.09 | 5.0-10.0 |
| 4. Degassing agent | .5 | .25-2.0 |
| 5. Ricinoleic acid | 1.5 | .5-3.0 |
| 6. Glass Flake | 37.50 | 20-50 |
| 7. Silica Carrier e.g., (3-aminopropyl) triethoxysilane (Active 45%-50%)/ Silicone Dioxide | 5.0 | 0.3-5.0 |
| Total | 100 g | |

REPRESENTATIVE BINDER DESCRIPTIONS

1. Polyethylene Resins: Dowlex 2344 ethylene-octene copolymer, DGDB-2480NT, DGDA-5004 NT7, and LDPE such as 5351 Low Density Polyethylene resins from Dow Chemical.
2. Polyester Hydroxyl Resins: Rucote 118, 102, 106, Sun Polymer SP011, SP400, AH-1250SF.
3. Curatives: Crelan NI2 Blocked Cycloaliphatic Polyisocyanate, TGIC (triglycidylisocyanurate), Alcure 4400, 4402, and 4450 block aliphatic and aromatic polyisocyanate curatives.
4. Estron's Benzoin, Surfynol's 104S and ZCP's CM500W degassing agent.
5. Vantico's Plant Oil (12-hydroxy-9-cis-octadecenoic acid)-Ricinoleic acid.
6. ECR Glass Flake's GF100, 200 and 300, China's Glass Flake's Co, C-28, C-90 and C-150.
7. Silica Carrier (3-aminopropyl)triethoxysilane a Silicone Dioxide-Precipitated Amorphous Silicate (Master batch Polymer).

In one embodiment, PF45 may be prepared by admixing the polyethylene/polyester resin binder, curative, and degassing agent, spherical flake and other components. The components are admixed either with a tumbler for 40-55 minutes or with a MIXACO high speed mixer used for blending raw material constituents for 45-50 seconds at ambient temperature and pressure or until such components are fully blended. the admixture is extruded to distribute the constituents and form an extrusion product. Any suitable extruder may be used and the extruder may utilize a single or twin screw mechanism. The blended material is placed in the extruder hopper and fed via the screw mechanism to the extruder dye, preferably with three temperature zones. The zone settings may be, respectively, 60/60/140 F. The blended constituents are extruded at 300 RPM and at a feed rate of 400 g/min to form an extrusion product.

The extrusion sheet product is then ground into particles with a suitable grinding machine such as a Retch mill grinder or coffee grinder. The extrusion product is grounded for about 1-5 minutes at ambient temperature and pressure to form a powder having a typical particle size between about 30 to 50 µm.

This powder represents PF45 binder system and constituents from Table (1) 1-5. This is then blended with constituent #7 silica carrier masterbatch polymer (45%-55% active) to complete formation of PF45 control component control additive.

Afterward this material can be used as desired to replace current flow aids or leveling agents. For example, this material replaces as a single component for PF-67 or Oxymelt A-2. This product can also be post added at the percentages described above in the summary section.

Representative Characteristics of PF45:
1. PF45 is a unique and novel platform designed to remove foreign anomalies. Forces between molecules at the surface are not evenly distributed on all sides as compared to molecules in the inner layers. This causes surface tension which is the result of unevenly and unbalanced anomalies or molecules. The influences of shapes of molecules, linear and larger surface results in higher dispersive force. The smaller spherical lower dispersive forces.
2. Increases flow by being less viscous.
3. Improve surface tension in powder and liquid coating system platforms formed by coating compositions and constituents by aiding with creating a lower viscosity during endothermic reaction period.
4. PF45 increases flow during the endothermic reaction at an increase rate, allowing for a smooth surface after solidification.
5. Improves mar and scratch resistance with standard powder coatings platforms such as TGIC, Hybrid (Polyester-Epoxy combinations), and Epoxy from 2B up to 4H pencil hardness following standard ASTM 3363 methods for Pencil Hardness test. Pencil hardness standard ranges are as follows: 6B, 5B, 4B, 3B, 2B, B, HB, F, H, 2H, 3H, 4H, 5H, 6H.
6. Chemical resistance to a host of reagents such as acetic acid, sulfuric acid, hydrochloric acid and acetic anhydride corrosive acids and bases such as sodium hydroxide (NaOH) and Potassium hydroxide (KOH) which are all key reagents used for obtaining certification for coating platforms.
7. PF45 binder platform is cured 10 min. @ 375° F. or 20 min. @ 350° F. using a convection oven such as laboratory oven from Blue M, White Deer Pa.
8. Less than 0.6% to 1.5 grams of required additive per 1000 grams when post blending invention additive.

Having described the invention in detail and by reference to preferred embodiments thereof, it will be apparent that modifications and variations are possible without departing from the scope of the invention as defined by the following claims.

What is claimed is:

1. A powder coating flow aid comprising:

|  | Weight % Range |
| --- | --- |
| Polyethylene resin | about 3.1 to about 9.5 |
| Polyester hydroxyl resin | about 35 to about 50.0 |
| Polymeric curative | about 5.0 to about 10.0 |
| Degassing agent | about 0.25 to about 2.0 |
| Ricinoleic acid | about 0.5 to about 3.0 |
| Glass Flake | about 20 to about 50 |
| Silica Carrier | about 0.5 to about 5.0. |

2. The flow aid of claim 1 wherein the polyethylene resin is ethylene-octene copolymer or a low density polyethylene resin.

3. The flow aid of claim 2 wherein the curative is a blocked cycloaliphatic, aliphatic or aromatic polyisocyanate.

4. The flow aid of claim 3 wherein the silica carrier is a 3-aminopropyl triethoxysilane.

5. A powder coating composition comprising a powder coating resin and the powder coating flow aid of claim 1.

6. The powder coating composition of claim 5 wherein the flow aid is present in an amount of about 0.5 to 1.5%.

7. The powder coating composition of claim 5 wherein the powder coating resin is a thermosetting resin.

8. The powder coating composition of claim 7 wherein the thermosetting resin is selected from the group consisting of epoxy, epoxy-polyester, and TGIC-free polyester resins or combinations thereof.

9. The powder coating composition of claim 7 wherein the thermosetting powder coating resin is an epoxy resin.

10. The powder coating composition of claim 8 wherein the epoxy resin is a bisphenol A epoxy resin.

11. The powder coating composition of claim 8 wherein the thermosetting resin is an epoxy-polyester resin.

12. The powder coating composition of claim 5 wherein the flow aid includes:

|  | Weight % |
| --- | --- |
| Polyethylene resin | about 6.2 |
| Polyester hydroxyl resin | about 41.210 |
| Polymeric curative | about 8.09 |
| Degassing agent | about .5 |
| Ricinoleic acid | about 1.5 |
| Glass Flake | about 37.50 |
| (3-Aminopropyl) triethoxysilane/Silicone Dioxide | about 5.0. |

13. The flow aid of claim 1 wherein the flow aid comprises:

|  | Weight % |
| --- | --- |
| Polyethylene resin | about 6.2 |
| Polyester hydroxyl resin | about 41.210 |
| Polymeric curative | about 8.09 |
| Degassing agent | about .5 |
| Ricinoleic acid | about 1.5 |
| Glass Flake | about 37.50 |
| (3-Aminopropyl) triethoxysilane/Silicone Dioxide | about 5.0. |

* * * * *